W. N. Bartholomew,
Slate Frame.
No. 100,712. Patented Mar. 15, 1870.
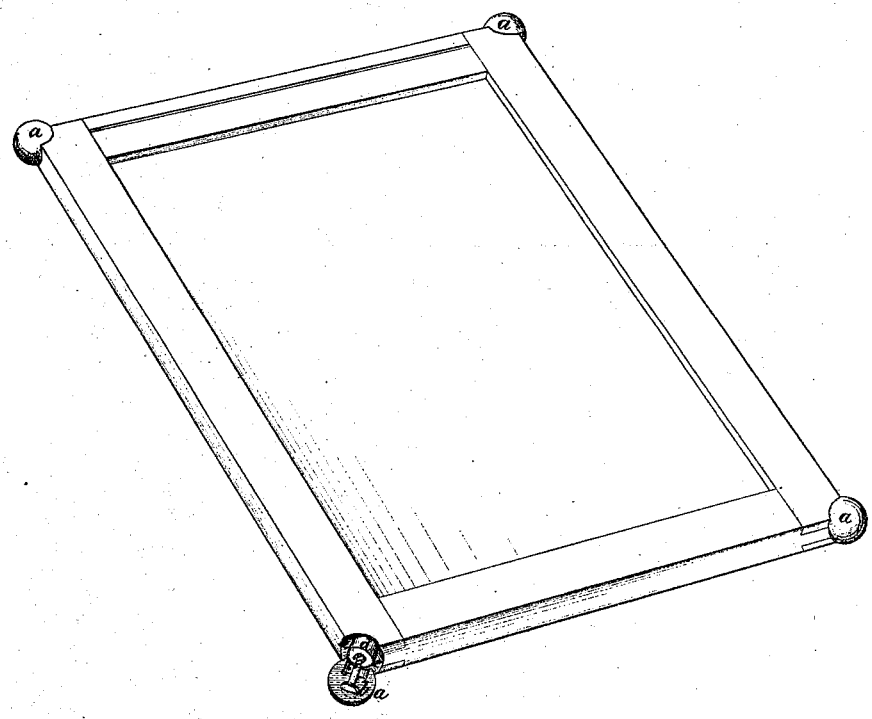
Wm. N. Bartholomew
by his attorney
A. Pollok
WITNESSES.

United States Patent Office.

WILLIAM N. BARTHOLOMEW, OF NEWTON CENTRE, MASSACHUSETTS.

Letters Patent No. 100,712, dated March 15, 1870.

IMPROVEMENT IN SLATE-FRAMES.

The Schedule referred to in these Letters Patent and making part of the same.

*To whom it may concern:*

Be it known that I, WILLIAM N. BARTHOLOMEW, of Newton Centre, county of Middlesex, and State of Massachusetts, have invented certain new and useful Improvements in Elastic Corners for Slate-Frames; and I hereby declare the following to be a full, clear, and exact description of the same, reference being had to the accompanying drawing, which represents a slate-frame made in accordance with my invention.

This invention is directed to the formation of an elastic corner for slate-frames; and Its object is to produce a cheap and durable corner, which shall have as firm and permanent connection as possible with the slate-frame.

To this end, I employ a globular or other suitably-shaped piece of rubber or other elastic material, in which is imbedded a screw whose shank projects from the rubber, and is adapted to be screwed into the corner of the frame or into a tenon formed therein for its reception.

A recess around the tenon, whose shape conforms to that of the adjoining portion of the rubber, serves to partly receive the rubber corner, and the screw, after it has entered the proper distance into the tenon, holds all the parts tightly together.

The manner in which my invention is or may be carried into effect will be readily understood by reference to the accompanying drawing.

The elastic corner is seen at *a*. It consists of a piece of vulcanized rubber of suitable shape, in this instance globular.

A screw, *b*, is imbedded in the rubber before vulcanization, and is so arranged that its shank will project from the rubber the proper distance to allow it to enter the slate-frame.

Around the shank of the screw there is formed in the rubber a recess, *c*, of cylindrical or other form, to fit the tenon on the slate-frame.

This tenon is represented at *d*, and around it is made a recess, *e*, of such shape as to conform to the shape of the adjoining portion of the rubber corner. It will be observed that the rubber can turn upon the screw, so that, when the latter is screwed into the frame, the rubber corner may be handled and turned or twisted without danger of loosening the screw.

In putting the parts together, the screw *b* is screwed down into the tenon, carrying the rubber corner with it, until the tenon has fully entered the recess *c* and the rubber is drawn into the recess *e*, so as to be in close contact with the slate-frame.

The parts are now in proper position, and the rubber is held firmly and permanently in place.

As the rubber is adapted to turn upon the screw, I employ, when securing the corner to the frame, a clamping mechanism which will grasp the rubber tightly enough to produce friction between the rubber and screw, sufficient to enable me to turn the screw into the corner of the frame. It will be noticed that the head of the screw extends outward beyond the center of the rubber ball, so as to support the same and give it the necessary stiffness.

At times it may be found advisable to dispense with the tenon and insert the screw into the recessed corner directly, but I much prefer the arrangement above described.

Having now described my invention, and the manner in which the same is or may be carried into effect,

What I claim, and desire to secure by Letters Patent, is—

1. An elastic corner for slate-frames, consisting of vulcanized rubber of globular or other suitable shape, in combination with a screw imbedded in said rubber before its vulcanization, and adapted to be applied to the slate-frame, substantially as shown and set forth.

2. The combination of the screw and the vulcanized rubber ball, or its equivalent, formed with a recess around the shank of the screw, with the tenon and recess in the slate-frame, substantially as shown and set forth.

In testimony whereof I have signed my name to this specification before two subscribing witnesses.

WM. N. BARTHOLOMEW.

Witnesses:
JOHN D. LONG,
WILLIAM BARTLETT.